E. L. AIKEN.
PHONOGRAPH RECORD MOLD.
APPLICATION FILED OCT. 12, 1905.
956,922.
Patented May 3, 1910.
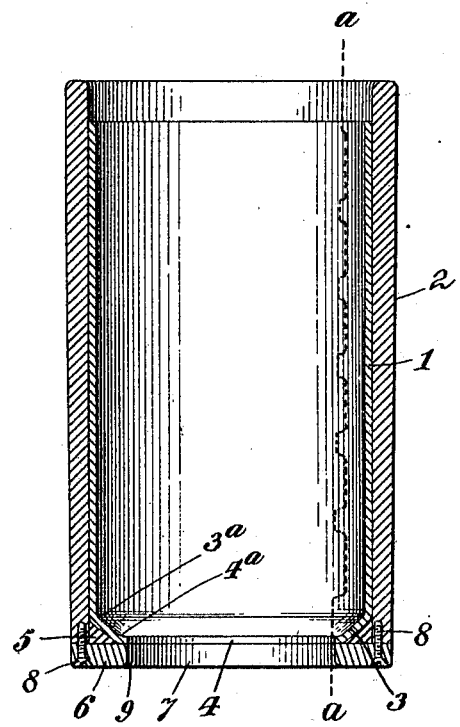
Attest:
Edgworth Greene
Delos Holden
Inventor:
Edward L. Aiken
by Frank L. Dyer, Atty.

UNITED STATES PATENT OFFICE.

EDWARD L. AIKEN, OF EAST ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH-RECORD MOLD.

956,922. Specification of Letters Patent. Patented May 3, 1910.

Application filed October 12, 1905. Serial No. 282,365.

*To all whom it may concern:*

Be it known that I, EDWARD L. AIKEN, a citizen of the United States, residing at East Orange, in the county of Essex and State of New Jersey, have invented certain new and useful Improvements in Phonograph-Record Molds, of which the following is a description.

My invention relates to the molding of phonograph records and more particularly to a molding process wherein a tubular mold is caused to descend into a bath of molten material which fills the mold, a coating of which congeals on the interior surface thereof and adheres to the same when the mold is removed from the bath, after which the bore of the congealed material is reamed out before it hardens.

In carrying out a process of this description it is very desirable that the mold be capable of forming the lower end of the record into a shape suitable for the finished article. This has however heretofore been impossible, as the wax congeals as soon as it encounters the mold and there is a great tendency for air bubbles to be entrapped between the surface of the mold and the wax, so that the practice heretofore has always been to form a rough end and remove the same by a cutter after the material has hardened.

My invention has for its object the provision of a mold which shall be capable of molding the lower end of a record into finished form; which will be strong mechanically in order that it may not be injured by rough handling extending over a long period of time; and more particularly that the interior or bore of the mold should be protected against injury by the reaming knife or by handling.

With these ends in view my invention consists in the features hereinafter described and claimed.

Reference is hereby made to the accompanying drawing which shows in longitudinal section a mold constructed in accordance with my invention.

The mold comprises a hollow cylinder 1 which carries upon its bore a negative representation of a sound record. This may be obtained in any well known manner as for instance by depositing upon a master record a metallic coating, as described in U. S. Patent No. 713,863 to Thomas A. Edison, and afterward electro-plating upon said coating a shell of any suitable metal such as copper. This shell may be strengthened and protected by shrinking upon the same a brass cylinder 2. The upper end of this cylinder projects beyond the shell 1 thereby protecting the same. The lower end of the shell 1 extends inward and downward as shown, whereby a conical or beveled surface 3 is formed terminating in a central aperture 4. This surface 3 merges into the vertical portion of the shell 1 by a gentle curve $3^a$ and reaches the opening 4 by a similar curve $4^a$ extending toward the horizontal, so that the lower end of the molded article will be rounded off by reason of the curve $4^a$, and the molten wax as it slowly enters the mold through the opening 4 will drive the air before it and will not entrap any of the air as would be the case if sharp curves or angles were present. Between the inclined portion 3 of the shell and the cylinder 2 is a space which is filled with soft metal 5 such as lead. The lower end of the mold is finished by securing thereto a ring 6 having an opening 7 which coincides with the opening 4. The ring may be of steel and secured to the cylinder 2 by screws 8. This ring covers the inclined portion 3 of the shell 1 and protects it against injury. It enables one to ream the congealed material along the line $a$, $a$ since the ring 6 will protect the shell 1 against injury by the reaming knife. The lower end of the record will therefore be in its finished condition at the time it is removed from the mold.

In practice, the reaming knife passes very close to the bore of the ring 6, but does not ordinarily touch the same, the amount of clearance being exaggerated in the drawing. Any wax adhering thereto after the reaming operation may be easily wiped out before it hardens by the finger. The lower end of the bore of the ring is rounded as at 9, so that it is not easily dented and the formation of air bubbles is prevented.

Having now described my invention, what I claim as new and desire to secure by Letters Patent is:

1. A tubular mold having an inwardly extending lower portion surrounding an aperture, said portion merging into the main portion by a gentle curve, substantially as set forth.

2. A tubular mold having a lower tapering portion extending inward and downward and terminating in a central opening, said tapering portion merging into the main portion by a gentle curve, substantially as set forth.

3. A tubular mold having a lower tapering portion extending inward and downward, and terminating in a central opening, said tapering portion gently curving toward the horizontal as it reaches the opening, substantially as set forth.

4. A tubular mold comprising an inner cylindrical shell extending inward at its lower end, a cylindrical backing surrounding said shell and a ring covering the bottom of said shell, substantially as set forth.

5. A tubular mold comprising an inner cylindrical shell, extending inward and downward at its lower end, a cylindrical backing surrounding said shell and a ring covering the bottom of said shell, substantially as set forth.

6. A tubular mold comprising an inner cylindrical shell of electro-deposited metal of substantially uniform thickness and extending inward at its lower end, a cylindrical backing surrounding said shell and a ring covering the bottom of said shell, substantially as set forth.

7. A tubular mold comprising an inner cylindrical shell, a cylindrical backing surrounding said shell and extending beyond the same at its upper end and a ring covering the bottom of said shell, substantially as set forth.

8. A tubular mold comprising an inner cylindrical shell extending inward and downward at its lower end, a cylindrical backing surrounding said shell, a filler between the backing and the inwardly extending portion of the shell and a ring covering the bottom of said shell, substantially as set forth.

9. A tubular mold comprising an inner cylindrical shell extending inward and downward at its lower end, a cylindrical backing surrounding said shell, a soft metal filler between the backing and inwardly extending portion of the shell, and a ring covering the bottom of said shell, substantially as set forth.

10. A tubular mold comprising an inner cylindrical shell extending inward at its lower end, a cylindrical backing surrounding said shell and a ring covering the bottom of said shell, said ring fitting closely against the bottom of the shell and having the same internal diameter as the smallest portion thereof, substantially as set forth.

11. A tubular mold comprising an inner cylindrical shell extending inward at its lower end, a cylindrical backing surrounding said shell, and a ring covering the bottom of the shell, the lower edge of the bore of said ring being rounded off, substantially as set forth.

12. A tubular mold comprising an inner cylindrical shell extending inwardly at one end, a cylindrical backing surrounding said shell and a ring covering the bottom of said shell and secured to the backing, substantially as set forth.

This specification signed and witnessed this 28th day of September, 1905.

EDWARD L. AIKEN.

Witnesses:
 DELOS HOLDEN,
 FRANK L. DYER.